US012634190B1

(12) United States Patent
Findling et al.

(10) Patent No.: US 12,634,190 B1
(45) Date of Patent: May 19, 2026

(54) AUTONOMOUS CYBERSECURITY OPERATIONS CENTER UTILIZING MICRO-MODEL ARCHITECTURE

(71) Applicant: Conifers Technologies, Inc., Dallas, TX (US)

(72) Inventors: Tom Findling, Dallas, TX (US); Alon Yotvat, Dallas, TX (US); Mark Kurman, Binyamina (IL)

(73) Assignee: Conifers Technologies, Inc., Dallas, TX (US)

( * ) Notice: Subject to any disclaimer, the term of this patent is extended or adjusted under 35 U.S.C. 154(b) by 0 days.

(21) Appl. No.: 18/952,274

(22) Filed: Nov. 19, 2024

(51) Int. Cl.
*H04L 41/06* (2022.01)

(52) U.S. Cl.
CPC ........ *H04L 41/06* (2013.01); *G06F 2221/034* (2013.01)

(58) Field of Classification Search
CPC .......................... H04L 41/06; G06F 2221/034
See application file for complete search history.

(56) References Cited

U.S. PATENT DOCUMENTS

| | | | | |
|---|---|---|---|---|
| 10,270,644 | B1 * | 4/2019 | Valsecchi | ................ H04L 43/08 |
| 10,681,061 | B2 | 6/2020 | Jang et al. | |
| 10,685,293 | B1 | 6/2020 | Heimann et al. | |
| 10,938,678 | B2 * | 3/2021 | Ghosh | ................... G06F 40/295 |
| 11,729,204 | B1 | 8/2023 | Coull et al. | |
| 11,909,757 | B2 | 2/2024 | Kibler et al. | |
| 12,309,185 | B1 * | 5/2025 | Skarphedinsson | .... H04L 67/535 |
| 2008/0189788 | A1 * | 8/2008 | Bahl | ................... H04L 63/1416 |
| | | | | 726/25 |
| 2020/0201989 | A1 * | 6/2020 | Shu | ........................ G06F 21/577 |
| 2021/0012239 | A1 * | 1/2021 | Arzani | .................... H04L 43/50 |
| 2023/0291755 | A1 | 9/2023 | Siebel et al. | |
| 2024/0242154 | A1 * | 7/2024 | Jindal | ................ G06Q 10/0637 |
| 2024/0430289 | A1 * | 12/2024 | Engelberg | .......... H04L 63/1433 |

OTHER PUBLICATIONS

Arici, Nicola, et al. "LLM-based Approaches for Automatic Ticket Assignment: A Real-world Italian Application." NL4AI@ AI* IA. (Year: 2023).*
McCoy, R. Thomas, et al. "How much do language models copy from their training data? evaluating linguistic novelty in text generation using raven." Transactions of the Association for Computational Linguistics 11: 652-670. (Year: 2023).*

(Continued)

*Primary Examiner* — John M Macilwinen
(74) *Attorney, Agent, or Firm* — M&B IP Analysts, LLC

(57) ABSTRACT

A system and method for improving security operations center (SOC) response to cybersecurity events is presented. The method includes extracting data from a plurality of data sources of a computing environment; receiving a plurality of data guidelines respective of the computing environment; configuring a plurality of micro-models of a SOC system based on: the extracted data and the plurality of data guidelines; receiving a ticket record, the ticket record generated based on an event in the computing environment; processing the ticket record utilizing a portion of the plurality of micro-models; generating a mitigation action based on the processed ticket record; and initiating the mitigation action in the computing environment.

25 Claims, 5 Drawing Sheets

(56)          References Cited

OTHER PUBLICATIONS

Maatouk, Ali, et al. "Large language models for telecom: Forth-coming impact on the industry." IEEE Communications Magazine. Jul. (Year: 2024).*

Remil, Youcef, et al. "Aiops solutions for incident management: Technical guidelines and a comprehensive literature review." arXiv preprint arXiv:2404.01363. Apr. (Year: 2024).*

Forbes, Bernard Marr, "The Vital Difference Between Machine Learning and Generative AI," Jun. 25, 2024, retrieved from the Internet on Dec. 12, 2025.

* cited by examiner

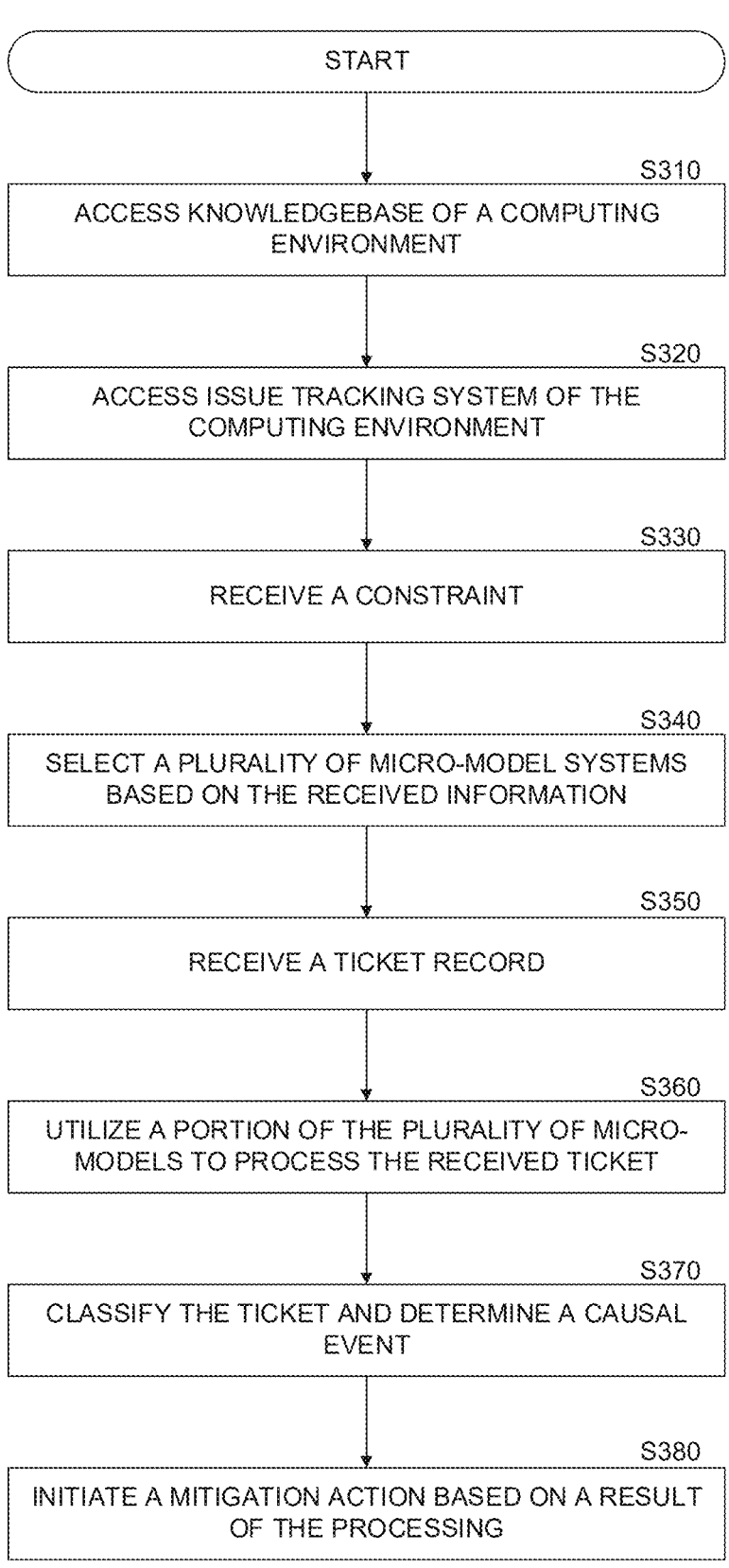

START

S310
ACCESS KNOWLEDGEBASE OF A COMPUTING ENVIRONMENT

S320
ACCESS ISSUE TRACKING SYSTEM OF THE COMPUTING ENVIRONMENT

S330
RECEIVE A CONSTRAINT

S340
SELECT A PLURALITY OF MICRO-MODEL SYSTEMS BASED ON THE RECEIVED INFORMATION

S350
RECEIVE A TICKET RECORD

S360
UTILIZE A PORTION OF THE PLURALITY OF MICRO-MODELS TO PROCESS THE RECEIVED TICKET

S370
CLASSIFY THE TICKET AND DETERMINE A CAUSAL EVENT

S380
INITIATE A MITIGATION ACTION BASED ON A RESULT OF THE PROCESSING

FIGURE 3

AUTONOMOUS CYBERSECURITY OPERATIONS CENTER UTILIZING MICRO-MODEL ARCHITECTURE

TECHNICAL FIELD

The present disclosure relates generally to cybersecurity, and specifically to improving response time of mitigation actions of security operation centers.

BACKGROUND

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include extracting data from a plurality of data sources of a computing environment. The method may also include receiving a plurality of data guidelines respective of the computing environment. The method may furthermore include configuring a plurality of micro-models of a SOC system based on: the extracted data and the plurality of data guidelines. The method may in addition include receiving a ticket record, the ticket record generated based on an event in the computing environment. The method may moreover include processing the ticket record utilizing a portion of the plurality of micro-models. The method may also include generating a mitigation action based on the processed ticket record. The method may furthermore include initiating the mitigation action in the computing environment. Other embodiments of this aspect include corresponding computer systems, apparatus, and computer programs recorded on one or more computer storage devices, each configured to perform the actions of the methods.

Implementations may include one or more of the following features. The method may include: utilizing a portion of the plurality of micro-models to generate a context based on data extracted from the ticket record; classifying the ticket record based on the generated context; and generating a mitigation action based on the classification. The method may include: determining a causal event based on the classification. The method may include: generating the mitigation action further based on the determined causal event. The method may include: accessing a knowledgebase of the computing environment; accessing an issue tracking system of the computing environment; and extracting the data from the knowledgebase and from the issue tracking system, where the knowledgebase and the issue tracking system are data sources of the plurality of data sources. The method may include: receiving a plurality of exceptions respective of the computing environment; and configuring the micro-models further based on the received plurality of exceptions. The method may include: receiving feedback from the computing system in response to initiating the mitigation action; generating a secondary mitigation action based on the received feedback; and initiating the secondary mitigation action. The method may include: configuring a micro-model of the plurality of micro-models to generate the secondary mitigation action. The method where a micro-model of the plurality of micro-models is any one of: a language model, a large language model, a small language model, a statistical model, a Markov model, a rule engine, a generative artificial intelligence, and any combination thereof. The method may include: generating a context for a language model based on the extracted data; generating a prompt for a language model based on the received ticket record and the generated context; and processing the prompt by the language model to generate the mitigation action. The method where a first data source of the plurality of data sources is a structured data source. The method where a second data source of the plurality of data sources is an unstructured data source. Implementations of the described techniques may include hardware, a method or process, or a computer tangible medium.

In one general aspect, non-transitory computer-readable medium may include one or more instructions that, when executed by one or more processors of a device, cause the device to: extract data from a plurality of data sources of a computing environment; receive a plurality of data guidelines respective of the computing environment; configure a plurality of micro-models of a SOC system based on. Non-transitory computer-readable medium may also include the extracted data and the plurality of data guidelines; receive a ticket record, the ticket record generated based on an event in the computing environment; process the ticket record utilizing a portion of the plurality of micro-models; generate a mitigation action based on the processed ticket record; and initiate the mitigation action in the computing environment. Other embodiments of this aspect include corresponding computer systems, apparatus, and computer programs recorded on one or more computer storage devices, each configured to perform the actions of the methods.

In one general aspect, system may include one or more processors configured to: extract data from a plurality of data sources of a computing environment. The system may furthermore receive a plurality of data guidelines respective of the computing environment. The system may in addition configure a plurality of micro-models of a SOC system based on. The system may moreover the extracted data and the plurality of data guidelines. The system may also receive a ticket record, the ticket record generated based on an event in the computing environment. The system may furthermore process the ticket record utilizing a portion of the plurality of micro-models. The system may in addition generate a mitigation action based on the processed ticket record. The system may moreover initiate the mitigation action in the computing environment. Other embodiments of this aspect include corresponding computer systems, apparatus, and computer programs recorded on one or more computer storage devices, each configured to perform the actions of the methods.

Implementations may include one or more of the following features. The system where the one or more processors are further configured to: utilize a portion of the plurality of micro-models to generate a context based on data extracted from the ticket record; classify the ticket record based on the generated context; and generate the mitigation action based on the classification. The system where the one or more processors are further configured to: determine a causal event based on the classification. The system where the one or more processors are further configured to: generate the mitigation action further based on the determined causal event. The system where the one or more processors are further configured to: access a knowledgebase of the computing environment; access an issue tracking system of the computing environment; and extract the data from the knowledgebase and from the issue tracking system, where the knowledgebase and the issue tracking system are data sources of the plurality of data sources. The system where the one or more processors are further configured to: receive a plurality of exceptions respective of the computing environment; and configure the micro-models further based on the received plurality of exceptions. The system where the one or more processors are further configured to: receive feedback from the computing system in response to initiating the mitigation action; generate a secondary mitigation action based on the received feedback; and initiate the secondary mitigation action. The system where the one or more processors are further configured to a micro-model of the plurality of micro-models to generate the secondary mitigation action. The system where a micro-model of the plurality of micro-models is any one of: a language model, a large language model, a small language model, a statistical model, a Markov model, a rule engine, a generative artificial intelligence, and any combination thereof. The system where the one or more processors are further configured to: generate a context for a language model based on the extracted data; generate a prompt for a language model based on the received ticket record and the generated context; and process the prompt by the language model to generate the mitigation action. The system where a first data source of the plurality of data sources is a structured data source. The system where a second data source of the plurality of data sources is an unstructured data source.

Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 3 is an example flowchart of a method for generating a contextual investigation report, implemented in accordance with an embodiment.

DETAILED DESCRIPTION

Figure 1:
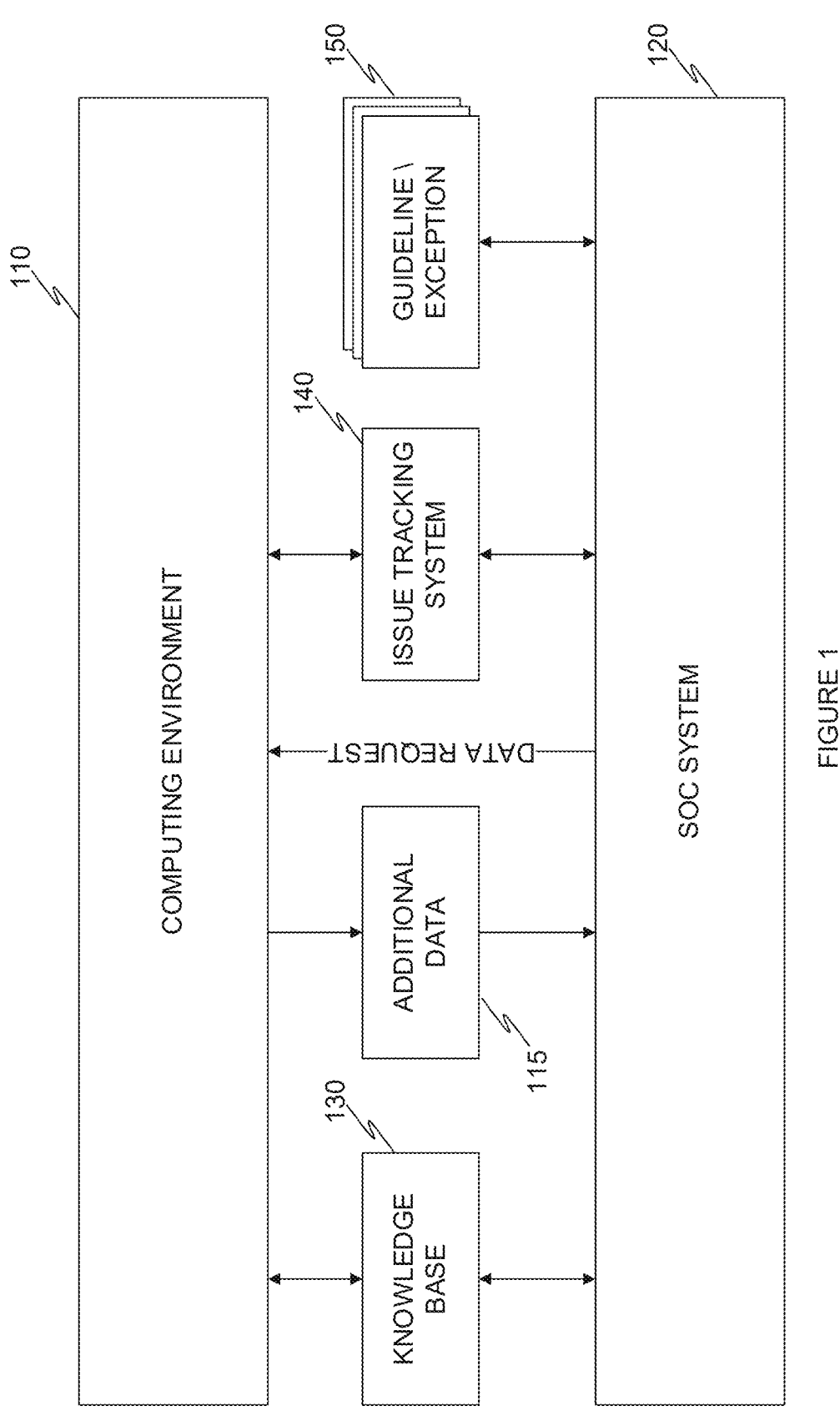
FIG. 1 is an example schematic diagram of a computing environment monitored by a security operations center system, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic diagram of a computing environment monitored by a security operations center system, implemented in accordance with an embodiment. In an embodiment, a computing environment 110 is a hybrid computing environment, an on-prem environment, a cloud computing environment, a combination thereof, and the like.

In some embodiments, the computing environment 110 is a cloud computing which includes a virtual private cloud (VPC), a virtual network (VNet), a virtual private network (VPN), a combination thereof, and the like.

In an embodiment, a cloud computing environment is deployed on a cloud computing infrastructure. In some embodiments, a cloud computing infrastructure is Amazon® Web Services (AWS), Google® Cloud Platform (GCP), Microsoft® Azure, and the like.

According to an embodiment, the computing environment 110 includes, or is otherwise communicatively coupled with, a plurality of data sources. In an embodiment, a data source is, for example, an issue tracking system 140, a knowledgebase 130, and the like. In some embodiments, a data source includes structured data, unstructured data, a combination thereof, and the like.

In some embodiments, the issue tracking system 140 is, for example, Jira®. In an embodiment, the issue tracking system 140 is configured to receive alerts, generate alerts, update alerts, etc. In some embodiments, the issue tracking system 140 is configured to receive an alert from a cybersecurity monitoring system, which is configured to monitor a computing environment 110 for a cybersecurity threat.

In an embodiment, the computing environment 110 further includes a knowledgebase 130. In some embodiments, the knowledgebase 130 includes structured data, unstructured data, a combination thereof, and the like. For example, in an embodiment, an issue tracking system 140 generates a ticket in response to detecting an issue, which is assigned to a user of the computing environment 110. In an embodiment, the issue is solved, and the ticket is marked as complete. In certain embodiments, a user generates an article, a document, etc., which details the steps taken to resolve the issue which led to the ticket being marked as complete. In such an embodiment, the article, document, etc., is an unstructured data stored in the knowledgebase 130.

In an embodiment, the knowledgebase 130 includes data from the computing environment 110, data generated by the SOC system 120, a combination thereof, and the like. In certain embodiments, the knowledgebase 130 is implemented, for example, utilizing a Confluence® page, a Wiki™ platform, and the like. In an embodiment, the knowledgebase 130 includes a plurality of sources, wherein a portion are deployed in the computing environment 110, a portion are external to the computing environment 110, etc.

In some embodiments, the SOC system 120 is configured to generate a context based on data extracted from the knowledgebase 130. In an embodiment, the knowledgebase 130 includes data respective of an organization, such as a role, a user account, a title, an organization hierarchy, a combination thereof, and the like.

According to certain embodiments, the knowledgebase 130 includes a list, a table, a graph, a digital representation, and the like, of a computing environment of an organization, of a plurality of computing environments of the organization, etc. In an embodiment, the digital representation includes a list of resource identifiers, a software bill of materials, and the like. In an embodiment, the digital representation is generated based on network discovery, querying an API of the computing environment, generating requests for an identity and access management (IAM) of the computing environment, a combination thereof, and the like.

Figure 2A:
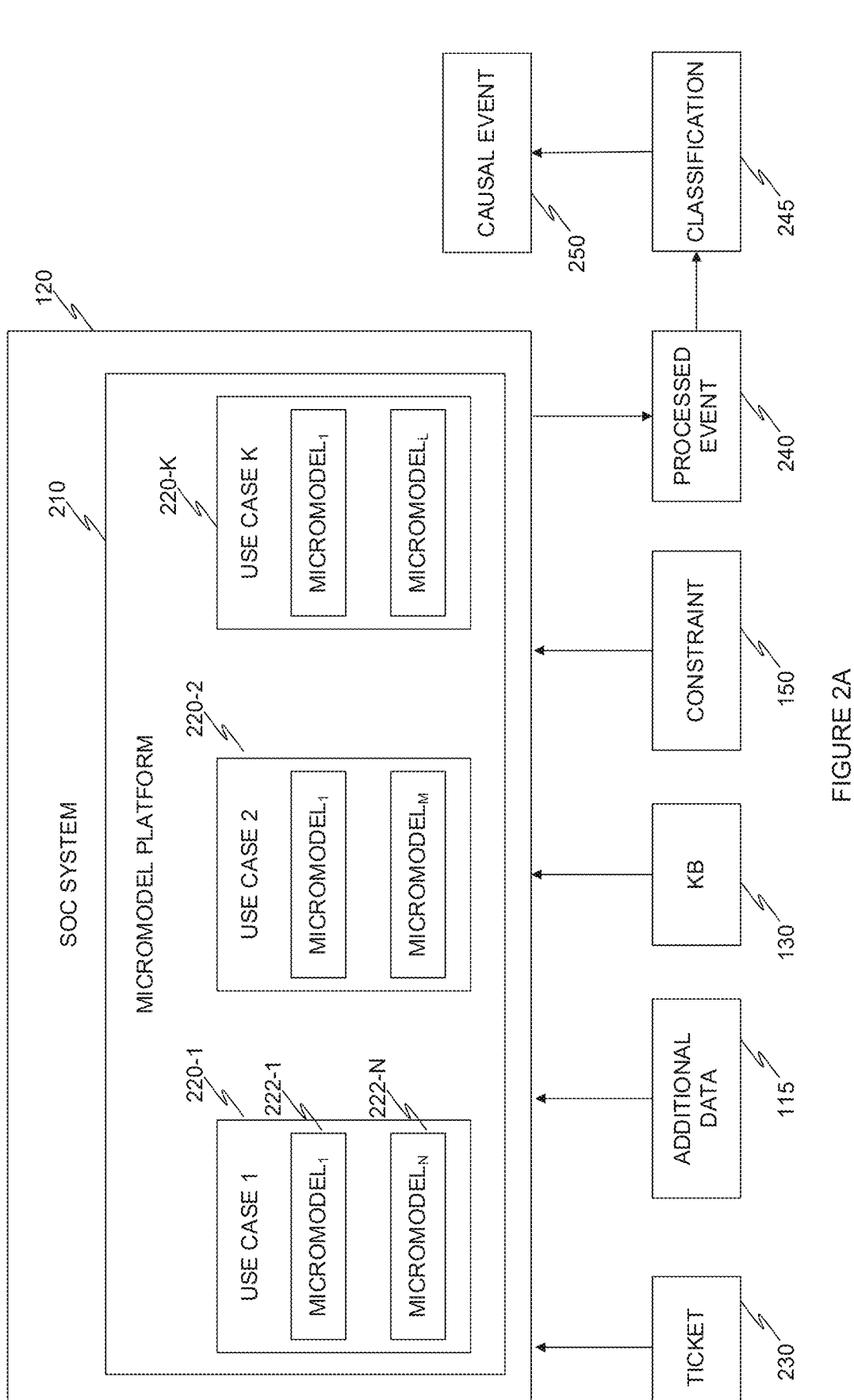
FIG. 2A is an example schematic diagram of a SOC system configured to generate contextual data of a computing environment event, implemented in accordance with an embodiment.
Figure 2B:
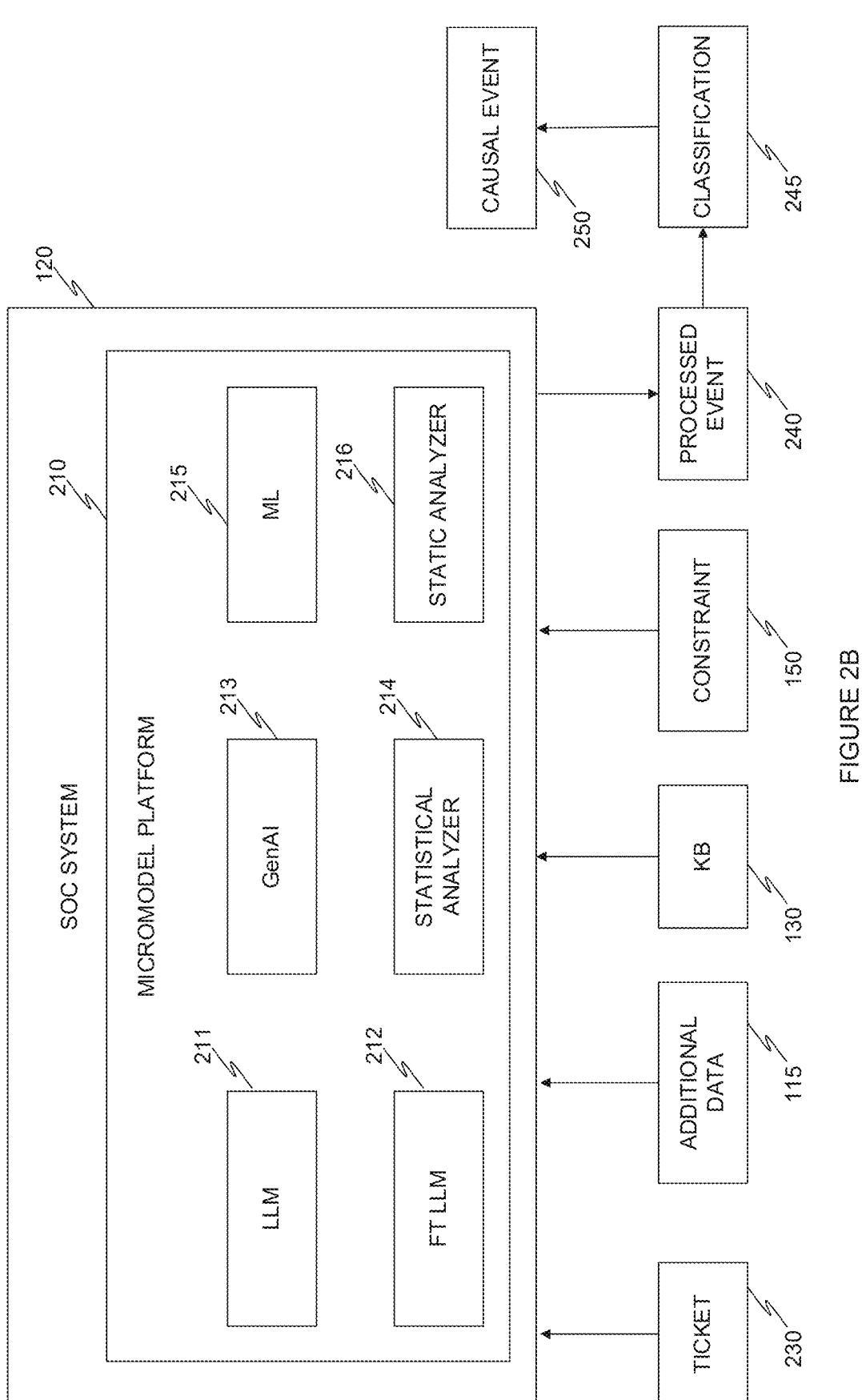
FIG. 2B is an example diagram of a SOC system utilizing a plurality of micromodels, implemented in accordance with an embodiment.

In certain embodiments, a micromodel of the SOC system 120, such as described in more detail in FIGS. 2A and 2B is configured to generate data stored in the knowledgebase 130.

In an embodiment, the knowledgebase 130 includes data which is collected, extracted, received, etc., from the computing environment 110. In an embodiment, the knowledgebase 130 includes data which is discovered, for example by utilizing network discovery techniques. For example, in certain embodiments, an active directory server is detected in the computing environment 110. In some embodiments, a notification is generated to indicate that the active directory server was not previously detected. In certain embodiments, a notification is presented to a user in order to receive confirmation, e.g., by form of an input, that the discovered active directory server is a sensitive asset. In some embodiments, a knowledgebase article is updated in the knowledgebase 130.

In some embodiments, user-generated content in a knowledgebase is not updated with discovered data, collected data, etc., instead such data is stored in a separate knowledgebase 130. In some embodiments, the knowledgebase 130 stores thereon constraints, guidelines, exceptions, a combination thereof, and the like. In an embodiment, such data includes, for example, an indicator that a resource is a sensitive resource (also referred to as a "crown jewel" resource), an indicator a user is sensitive (e.g., a high ranking member of an organization, an administrator of an organization, etc.), and the like.

In certain embodiments, knowledgebase data is collected, generated, discovered, etc., periodically, continuously, a combination thereof, and the like. For example, certain activities are performed periodically to collect data, while other activities are performed continuously, respective of the same computing environment, to collect data.

In an embodiment, a security operations center (SOC) system 120 is configured to access the computing environment 110, the issue tracking system 140, the knowledgebase 130, and the like. In some embodiments, the SOC system 120 is further supplied with a guideline, an exception, a rule, a policy, and the like. Such are marked, according to an embodiment, as constraints 150.

In some embodiments, the SOC system 120 is configured to generate a request for additional data 115 from the computing environment 110. In an embodiment, the additional data includes an identifier of a resource in the computing environment 110, an identifier of a user, a log entry, a combination thereof, and the like.

According to an embodiment, a ticket indicates an issue which requires a contextual investigation. In some embodiments, the SOC system 120 is configured to generate a contextual investigation based on a plurality of micromodels.

In an embodiment, the SOC system 120 is configured to generate contextual investigation data based on the ticket, on data extracted from the knowledgebase 130, on additional data 115 requested from the computing environment, the constraints 150, a combination thereof, and the like.

FIG. 2A is an example schematic diagram of a SOC system configured to generate contextual data of a computing environment event, implemented in accordance with an embodiment.

In an embodiment, a SOC system 120 includes a micromodel platform 210. In some embodiments, the micromodel platform 210 includes a plurality of micromodels. In an embodiment, a micromodel is a deterministic model, a non-deterministic model, a combination thereof, and the like, which is configured to process data.

In some embodiments, micromodels are assigned use cases 220-1 through 220-K, where 'K' is an integer having a value of '2' or more. For example, in an embodiment, use case 220-1 includes a plurality of micromodels 222-1 through 222-N, where 'N' is an integer having a value of '2' or more.

In an embodiment, a ticket 230 is classified into a use case 220 of the plurality of use cases 220. For example, in an embodiment, a language model micromodel is configured to classify the ticket 230 into at least one use case 220 of the plurality of use cases. In some embodiments, the classifying micromodel is configured to classify the ticket 230 into a plurality of use cases, each use case 220 further assigned a confidence score with respect to the classification of the ticket 230 to the use case.

For example, in an embodiment, the classifying micromodel assigns a confidence score of 23% of the ticket 230 assigned to use case 220-1, and a confidence score of 94% of the ticket 230 assigned to use case 220-2. In certain embodiments, each use case is assigned micromodels which are configured to process a certain type of ticket, process a certain type of event, are pretrained on predefined data (e.g., which is related to data of the ticket 230), fine-tuned based on predefined data, a combination thereof, and the like.

In certain embodiments, the SOC system 120 is configured to request additional data 115 from the computing environment respective of which the ticket 230 is generated. In some embodiments, the additional data includes a status of a resource referenced in the ticket, a status of another resource not referenced in the ticket, a status of a user, a status of a network, additional information from a knowledgebase, a combination thereof, and the like.

In some embodiments, the SOC system 120 is configured to request, detect, etc., data from a knowledgebase 130. For example, in an embodiment, a micromodel 222 is configured to generate a request based on data extracted from the ticket 230. In an embodiment, the request is a request for additional data 115, for an article from the knowledgebase 130, a combination thereof, and the like.

In certain embodiments, a micromodel 222 is configured to receive a constraint 150. For example, in an embodiment, a constraint 150 is an exception, a guideline, a policy, a rule, a combination thereof, and the like. For example, in an embodiment, an exception is an exception to a policy applied on a certain resource, principal, and the like, of the computing environment. In an embodiment, each use case 220 is assigned a constraint 150 which is unique to that use case.

In an embodiment, the SOC system 120 is configured to generate a processed event 240 based at least on the ticket 230. In some embodiments, the SOC system 120 is configured to generate the processed event 240 based on applying a plurality of micromodels 222 of a use case 220-1.

In some embodiments, the SOC system 120 is further configured to generate a classification 245 for the processed event 240. In certain embodiments, the classification 245 includes generating a context for the ticket 230.

In some embodiments, a causal event 250 is detected. According to an embodiment, a causal event 250 is an event which triggers the ticket 230, an alert, and the like. For example, in an embodiment, a causal event 250 is different from an event which is described by a ticket 230. For example, in an embodiment, a ticket 230 describes an event which corresponds to impossible travel.

In cybersecurity, this refers to a scenario where a user appears to log into a system or service from two geographically distant locations within a time frame that would make travel between them impossible. This is a red flag indicating potential credential theft, unauthorized access, account compromise, and the like.

The causal event 250 for this a result of a cybersecurity contextual investigation. For example, in such an embodiment, the SOC system 120 is configured to extract data from the ticket 230 and provide the data to a micromodel of a use case corresponding to impossible travel.

In an embodiment, the SOC system 120 is further configured to request additional data 115, for example based on the ticket 230, the use case 220-1, etc. For an impossible travel case, for example, the SOC system 120 is configured, according to an embodiment, to request location data for a user, request a calendar of the user, various combinations thereof, and the like.

In certain embodiments, for example where the calendar indicates travel, email records indicate a flight, etc., the causal event 250 is detected therefrom. For example, if a user has activity within a short period of time in IP addresses which correspond to multiple states, and an email record shows the user is currently in flight, then the causal event 250 which is associated with the processed event 240 is the flight.

In an embodiment, a mitigation action, a remediation action, and the like, are generated based on the causal event 250, the classification 245, the processed event 240, the ticket 230, a combination thereof, and the like. In some embodiments, the remediation action includes generating an alert, generating a ticket, generating a contextual investigation report, revoking access from a user, revoking access from a resource, revoking access to a resource, revoking a permission, a combination thereof, and the like.

FIG. 2B is an example diagram of a SOC system utilizing a plurality of micromodels, implemented in accordance with an embodiment. According to some embodiments, a micromodel is a deterministic model, a non-deterministic model, a combination thereof, and the like. In certain embodiments, it is advantageous to associate certain micromodels with use cases, and generate a processed event 240 based on a use case.

This allows, according to an embodiment, to generate a contextual investigation report based on the processed event 240. In an embodiment, the micromodel platform 210 includes a plurality of micromodels, such as a language model (e.g., large language model 211), a fine-tuned language model 212, a generative artificial intelligence (GenAI) 213, a statistical analyzer 214, a machine learning (ML) model 215, a static analyzer 216, a combination thereof, and the like.

In some embodiments, a language model 211 is a large language model, a small language model, and the like. In certain embodiments, the micromodel platform 210 includes a plurality of language models, each language model having a unique context length. In certain embodiments, each language model 211 includes a retrieval augmented generation (RAG) input. In an embodiment, the RAG input is modified based on a use case.

In certain embodiments, the language model 211 is a generative pre-trained transformer (GPT), a Bidirectional Encoder Representations from Transformers (BERT), a large language model Meta AI (LLaMA), and the like.

In an embodiment, a fine-tuned LLM (FT LLM) 212 is fine-tuned on a particular use case. For example, in impossible travel, an FT LLM 212 which is fine-tuned for impossible travel is trained based on travel information, geolocation techniques, and the like.

In an embodiment, a GenAI model 213 is unimodal, multimodal, and the like. In some embodiments, the GenAI model 213 includes a GAN (generative adversarial network), a transformer (e.g., GPT), a VAE (variational autoencoder), and the like.

In some embodiments, a machine learning (ML) model 215 includes an artificial neural network, a decision tree, a Bayesian network, a Gaussian process, and the like. In certain embodiments, a statistical analyzer 214 is configured to determine a probability of an event occurring, such as a probability of a causal event 250 of occurring based on data extracted from the ticket 230.

In certain embodiments, the static analyzer 216 is configured to perform static analysis of code, software application, software binaries, software libraries, and the like. In an embodiment, additional data 115 is extracted by the static analyzer 216, for example by performing static analysis on code objects of the computing environment and extracting data therefrom.

FIG. 3 is an example flowchart of a method for generating a contextual investigation report, implemented in accordance with an embodiment. In an embodiment, a computing environment generates multiple alerts, which are then turned into tickets by an issue tracking system. The issue tracking system is configured to assign the ticket to a human operator, and close a ticket in response to resolution of an issue identified in the ticket.

Increasingly, as computing environments grow more complex and ever larger, the amount of tickets likewise increases. Human operators suffer from alert fatigue, and it is advantageous to reduce the amount of time spent by a human operator on a ticket to a minimum.

Due to the nature of the evolving computing environments, and their fluid architecture, building a "playbook" or a straightforward deterministic model to handle all these tickets is not practical and does not serve as a pragmatic solution.

By contrast, the SOC system disclosed herein, utilizing a platform of use case-based micromodels, is able to provide a contextual investigation report for each ticket, and thereby decrease the time a human operator needs to devote to issue resolution.

At S310, a knowledgebase is accessed. In an embodiment, the knowledgebase (KB) is a KB of a computing environment, and includes structured data, unstructured data, a combination thereof, and the like. Structured data includes, for example, tables, files arranged in a specific format (e.g., JSON files), and the like. In an embodiment, a structured data is, for example, a table including names, user names, account names, a user group, and the like.

In an embodiment, an unstructured data is, for example, a document, a post, a text, and the like. For example, in an embodiment, an article in a KB, such as a wiki page, is an unstructured data. In some embodiments, an unstructured data includes an email, a calendar event, and the like.

At S320, an issue tracking system is accessed. In an embodiment, the issue tracking system is configured to generate a ticket, for example based on an alert from a computing environment. In some embodiments, the alert includes an identifier of a resource, an identifier of a user, an identifier of a user group, an action initiated in the computing environment, an access in the computing environment, and the like.

In an embodiment, the issue tracking system is implemented, for example, as a Jira® system. According to an embodiment, the issue tracking system is configured to assign a ticket to a human operator. In an embodiment, the ticket includes a flag, indicating if a ticket is open or closed. A closed ticket is a ticket which has been resolved, and an open ticket is a ticket for which resolution has not yet been achieved.

At S330, a constraint is received. In an embodiment, a constraint is a guideline, an exception, a policy, a rule, a condition, a combination thereof, and the like. For example, in an embodiment, the constraint is based on a data source (e.g., for the additional data), on a user group, on a permission, and the like.

In some embodiments, the constraint is provided to a SOC system, which in turn is configured to apply the constraint on at least a micromodel of a plurality of micromodels. In some embodiments, the constraint includes a retrieval augmented generation (RAG) input for a language model, such as a large language model.

At S340, a plurality of micromodels are selected. In an embodiment, the plurality of micromodels are selected based on a use case. In some embodiments, the SOC system is configured to extract data from a ticket, and utilize the extracted data to classify the ticket to one of a plurality of use cases. In an embodiment, each use case includes a micromodel, a plurality of micromodels, etc.

In certain embodiments, a micromodel is applied different constraint(s) based on the use case associated with the micromodel. For example, in an embodiment, a first micromodel is an LLM which is associated with a first constraint based on a first use case, and a second constraint based on a second use case.

In an embodiment, a micromodel is a language model, a fine-tuned language model, a machine learning model, a statistical analyzer, a static analyzer, a generative artificial intelligence model, a unimodal model, a multimodal model, a deterministic model, a non-deterministic model, a supervised learning model, an unsupervised learning model, a combination thereof, and the like.

At S350, a ticket is received. In an embodiment, a ticket is a record generated based on an event detected in the computing environment. In some embodiments, the ticket is received, accessed from, etc., an issue tracking system. In an embodiment, a ticket is assigned to a user, a user group, and the like.

According to some embodiments, the ticket includes data values which a SOC system is configured to extract therefrom. In an embodiment, the SOC system is configured to select a micromodel, a plurality of micromodels, and the like, based on data extracted from a ticket.

At S360, the selected micromodels are utilized. In an embodiment, the selected micromodels are utilized to process data extracted from the ticket. In some embodiments, utilizing the selected micromodels includes configuring a micromodel to extract data from a ticket, determine that additional data is required, and generating a request for additional data from the computing environment.

In an embodiment, utilizing a micromodel includes generating a prompt for a language model based on a RAG, a selected prompt template, a data value extracted from a ticket record, a combination thereof, and the like.

In certain embodiments, a first micromodel is utilized with a process result of a second micromodel. For example, in an embodiment, a first micromodel is configured to perform initial processing of data from the ticket, and a second micromodel is configured to process the result of the first micromodel.

In some embodiments, a micromodel is utilized based on a ticket record, a knowledgebase article, additional data from the computing environment, a combination thereof, and the like.

At S370, the ticket is classified. In an embodiment, the ticket is classified, and a causal event is detected based on the classification. In some embodiments, classifying a ticket includes a severity classification of the ticket. For example, in an embodiment, a ticket is classified as critical, high, medium, and low-impact severity. In some embodiments, a classification includes a classification score. In an embodiment, the classification score is a qualitative score, a quantitative score, a combination thereof, and the like.

In certain embodiments, the SOC system is configured to generate a contextual investigation report. In an embodiment, the contextual investigation report includes a result from at least a micromodel of the micromodel platform of the SOC system.

In an embodiment, the contextual investigation report is generated based on a result of a language model. In some embodiments, a language model is configured to receive as an input a result from at least a micromodel, and a prompt, wherein the prompt configures the language model to generate an output which includes the contextual investigation report. In certain embodiments, each use case is associated with a unique prompt for a contextual investigation report which is associated with that use case. This is advantageous as it reduces the probability a language model generates an output which includes a false result (colloquially known as a "hallucination").

In some embodiments, a causal event is detected. In an embodiment, a causal event is an event which causes a ticket to be created. For example, in an embodiment, a causal event is an external event (e.g., external to the computing environment) which causes events in the computing environment to appear as suspicious events, without the broader context which is provided, for example, by accessing the computing environment and receiving therefrom the additional data.

In the example of impossible travel, the causal event is travel of a user, which is apparent from the additional data which is extracted from the computing environment (e.g., from email records, calendar records, etc.). The causal event is external to the computing environment, while the event that triggers an alert is a user accessing the computing environment from multiple different locations in a short period of time.

At S380, a mitigation action is initiated. In an embodiment, a mitigation action includes generation a notification, generating an alert, generating a ticket, transferring a ticket to another user, revoking a permission, granting a permission, revoking access to a resource, revoking access from a resource, a combination thereof, and the like.

In an embodiment, a mitigation action includes generating a verdict for the ticket. In some embodiments, the verdict includes a determination for the ticket which indicates if the ticket is indicative of malicious activity, benign activity, inconclusive, and the like. In an embodiment, the verdict score is utilized to determine and prioritize a response.

In some embodiments, a ticket is assigned a priority, reassigned a priority, etc., based on a result of the generated contextual investigation report. In an embodiment, it is advantageous to prioritize tickets such that malicious activity is addressed first, and more benign activity is either not addressed, or addressed at a later time.

Figure 4:
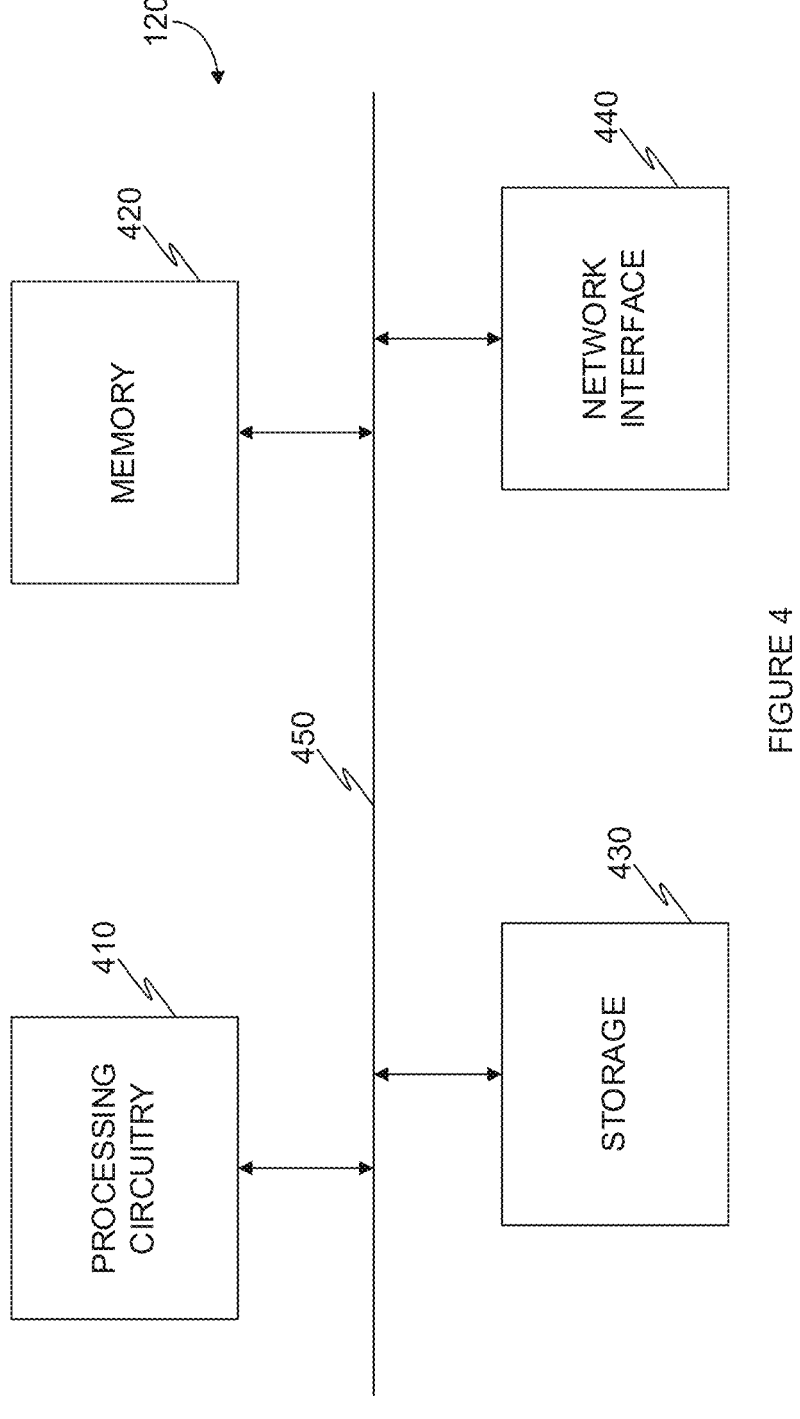
FIG. 4 is an example schematic diagram of a SOC system according to an embodiment.

FIG. 4 is an example schematic diagram of a SOC system 120 according to an embodiment. The SOC system 120 includes, according to an embodiment, a processing circuitry 410 coupled to a memory 420, a storage 430, and a network interface 440. In an embodiment, the components of the SOC system 120 are communicatively connected via a bus 450.

In certain embodiments, the processing circuitry 410 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 420 is a volatile memory (e.g., random access memory, etc.), a non-volatile memory (e.g., read only memory, flash memory, etc.), a combination thereof, and the like. In some embodiments, the memory 420 is an on-chip memory, an off-chip memory, a combination thereof, and the like. In certain embodiments, the memory 420 is a scratch-pad memory for the processing circuitry 410.

In one configuration, software for implementing one or more embodiments disclosed herein is stored in the storage 430, in the memory 420, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 410, cause the processing circuitry 410 to perform the various processes described herein, in accordance with an embodiment.

In some embodiments, the storage 430 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 440 is configured to provide the SOC system 120 with communication with, for example, the computing environment 110, according to an embodiment.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 20; 3A; A and B in combination; B and C in combination; A and C in combination; A, B, and C in combination; 2A and C in combination; A, 3B, and 2C in combination; and the like.

What is claimed is:

1. A method for improving security operations center (SOC) response to cybersecurity events, comprising:

extracting data from a plurality of data sources of a cloud computing environment, the plurality of data sources including a structured data source and an unstructured data source;

receiving a plurality of data guidelines respective of the cloud computing environment;

configuring a plurality of micro-models of a SOC system based on: the extracted data and the plurality of data guidelines;

receiving a ticket record, the ticket record generated based on an event in the cloud computing environment;

classifying the ticket record into a predetermined use case, the use case associated with a first micro-model of the plurality of micro-models and a second micro-model of the plurality of micro-models;

processing the entire ticket record utilizing the first micro-model and the second micro-model, wherein the first micro-model is a generative artificial intelligence (AI) model of a first type, and the second micro-model is a generative AI model of a second type;

generating a mitigation action utilizing a portion of the plurality of micro-models based on the processed ticket record; and initiating the mitigation action, responsive to the event, in the cloud computing environment.

2. The method of claim 1, further comprising:

utilizing a portion of the plurality of micro-models to generate a context based on data extracted from the ticket record;

classifying the ticket record based on the generated context; and generating the mitigation action based on the classification.

3. The method of claim 2, further comprising:

determining a causal event based on the classification.

4. The method of claim 3, further comprising:

generating the mitigation action further based on the determined causal event.

5. The method of claim 1, further comprising:

accessing a knowledgebase of the cloud computing environment;

accessing an issue tracking system of the cloud computing environment; and extracting the data from the knowledgebase and from the issue tracking system, wherein the knowledgebase and the issue tracking system are data sources of the plurality of data sources.

6. The method of claim 1, further comprising:

receiving a plurality of exceptions respective of the cloud computing environment; and configuring the micro-models further based on the received plurality of exceptions.

7. The method of claim 1, further comprising:

receiving feedback from a computing system in response to initiating the mitigation action;

generating a secondary mitigation action based on the received feedback; and initiating the secondary mitigation action.

8. The method of claim 7, further comprising:

configuring a micro-model of the plurality of micro-models to generate the secondary mitigation action.

9. The method of claim 1, wherein a micro-model of the plurality of micro-models is any one of: a language model, a large language model, a small language model, a statistical model, a Markov model, a rule engine, a generative artificial intelligence, and any combination thereof.

10. The method of claim 1, further comprising:

generating a context for a language model based on the extracted data;

generating a prompt for a language model based on the received ticket record and the generated context; and processing the prompt by the language model to generate the mitigation action.

11. The method of claim 1, further comprising:

generating a request for additional data from a data source of the plurality of data sources, based on a result of classifying the ticket record.

12. The method of claim 1, wherein the event is a single event.

13. A non-transitory computer-readable medium storing a set of instructions for improving security operations center (SOC) response to cybersecurity events, the set of instructions comprising:

one or more instructions that, when executed by one or more processors of a device, cause the device to:

extract data from a plurality of data sources of a cloud computing environment, the plurality of data sources including a structured data source and an unstructured data source;

receive a plurality of data guidelines respective of the cloud computing environment;

configure a plurality of micro-models of a SOC system based on: the extracted data and the plurality of data guidelines;

receive a ticket record, the ticket record generated based on an event in the cloud computing environment;

classify the ticket record into a predetermined use case, the use case associated with a first micro-model of the plurality of micro-models and a second micro-model of the plurality of micro-models;

process the entire ticket record utilizing the first micro-model and a second micro-model, wherein the first micro-model is a generative artificial intelligence (AI) model of a first type, and the second micro-model is a generative AI model of a second type;

generate a mitigation action utilizing a portion of the plurality of micro-models based on the processed ticket record; and initiate the mitigation action, responsive to the event, in the cloud computing environment.

14. A system for improving security operations center (SOC) response to cybersecurity events comprising:

one or more processors configured to:

extract data from a plurality of data sources of a cloud computing environment, the plurality of data sources including a structured data source and an unstructured data source;

receive a plurality of data guidelines respective of the cloud computing environment;

configure a plurality of micro-models of a SOC system based on: the extracted data and the plurality of data guidelines;

receive a ticket record, the ticket record generated based on an event in the computing environment;

classify the ticket record into a predetermined use case, the use case associated with a first micro-model of the plurality of micro-models and a second micro-model of the plurality of micro-models;

process the entire ticket record utilizing the first micro-model and a second micro-model, wherein the first micro-model is a generative artificial intelligence (AI) model of a first type, and the second micro-model is a generative AI model of a second type;

generate a mitigation action utilizing a portion of the plurality of micro-models based on the processed ticket record; and initiate the mitigation action, responsive to the event, in the cloud computing environment.

15. The system of claim 14, wherein the one or more processors are further configured to:

utilize a portion of the plurality of micro-models to generate a context based on data extracted from the ticket record;

classify the ticket record based on the generated context; and generate the mitigation action based on the classification.

16. The system of claim 15, wherein the one or more processors are further configured to:

determine a causal event based on the classification.

17. The system of claim 16, wherein the one or more processors are further configured to:

generate the mitigation action further based on the determined causal event.

18. The system of claim 14, wherein the one or more processors are further configured to:

access a knowledgebase of the cloud computing environment;

access an issue tracking system of the cloud computing environment; and extract the data from the knowledgebase and from the issue tracking system, wherein the knowledgebase and the issue tracking system are data sources of the plurality of data sources.

19. The system of claim 14, wherein the one or more processors are further configured to:

receive a plurality of exceptions respective of the cloud computing environment; and configure the micro-models further based on the received plurality of exceptions.

20. The system of claim 14, wherein the one or more processors are further configured to:

receive feedback from a computing system in response to initiating the mitigation action;

generate a secondary mitigation action based on the received feedback; and initiate the secondary mitigation action.

21. The system of claim 20, wherein the one or more processors are further configured to:

configure a micro-model of the plurality of micro-models to generate the secondary mitigation action.

22. The system of claim 14, wherein a micro-model of the plurality of micro-models is any one of:

a language model, a large language model, a small language model, a statistical model, a Markov model, a rule engine, a generative artificial intelligence, and any combination thereof.

23. The system of claim 14, wherein the one or more processors are further configured to:

generate a context for a language model based on the extracted data;

generate a prompt for a language model based on the received ticket record and the generated context; and process the prompt by the language model to generate the mitigation action.

24. The system of claim 14, wherein the one or more processors are further configured to:

generate a request for additional data from a data source of the plurality of data sources, based on a result of classifying the ticket record.

25. The system of claim 14, wherein the event is a single event.

* * * * *